United States Patent [19]

Brown

[11] Patent Number: 4,529,268
[45] Date of Patent: Jul. 16, 1985

[54] RETROFIT VISUAL DISPLAY LENS HOLDER

[75] Inventor: Eugene C. Brown, Birmingham, Mich.

[73] Assignee: Data Vu Company, Birmingham, Mich.

[21] Appl. No.: 487,309

[22] Filed: Apr. 21, 1983

[51] Int. Cl.³ .............................................. G02B 27/00
[52] U.S. Cl. ................................ 350/276 R; 350/452; 358/252; D14/106
[58] Field of Search .................. 350/276 R, 284, 452; 358/252, 253, 254, 255; D14/106

[56] References Cited

U.S. PATENT DOCUMENTS 4,051,535  9/1977  Inglis .................................. 358/255
4,391,495  7/1983  Mazurkewitz ...................... 350/452

OTHER PUBLICATIONS

Axford, "Tilt Mechanism for Reducing CRT Reflection", *IBM Technical Disclosure Bulletin*, vol. 25, No. 7A, Dec. 1982, p. 3304.

*Primary Examiner*—Bruce Y. Arnold
*Assistant Examiner*—William Propp
*Attorney, Agent, or Firm*—Cullen, Sloman, Cantor, Grauer Scott & Rutherford

[57] ABSTRACT

An adjustable lens holder for use with a computer visual display which is adapted to permit interchanging of different lenses. The lens holder retains a lens, or other optical element, in spaced relation from the screen and is adjustable relative thereto. The space between the lens and the screen may be changed and the lens may be moved from side to side in the device and locked in various angular relationships relative to the face of the screen. The optical element of the present invention may be one or more magnifying lenses, color tinting lens or anti-glare filter. In one embodiment the lens may be a special mask having indicia designed to compliment the programmed visual display.

15 Claims, 14 Drawing Figures

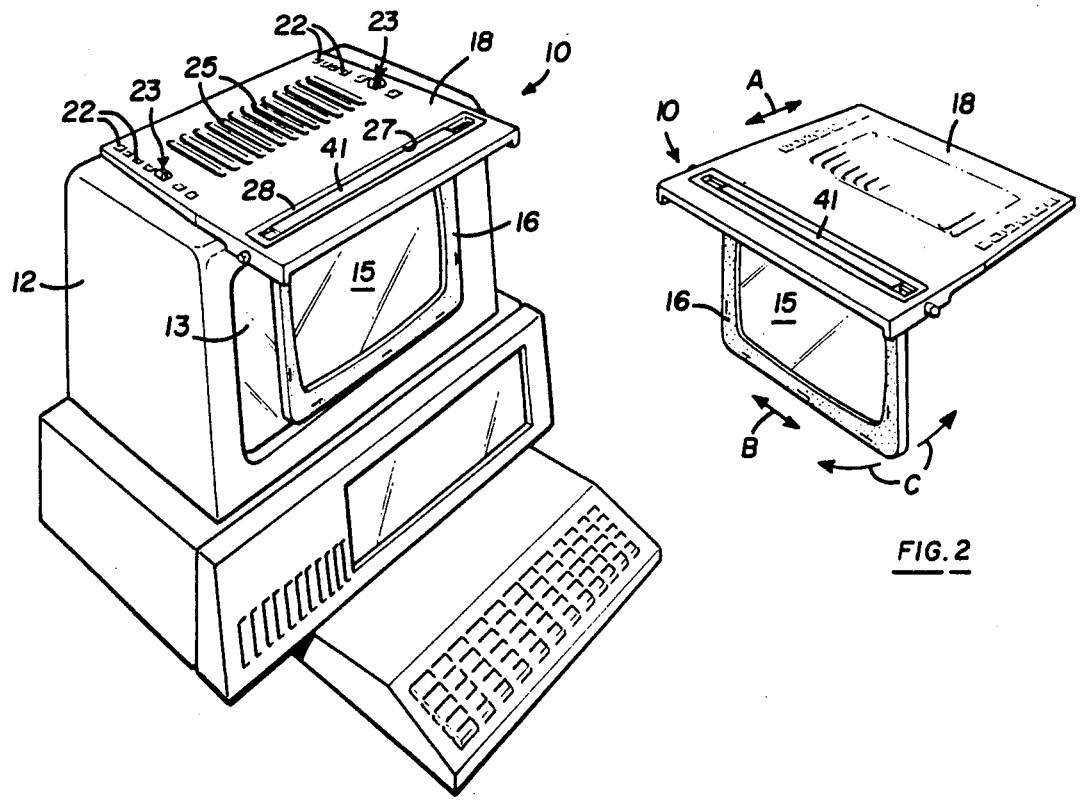
FIG. 1
FIG. 2
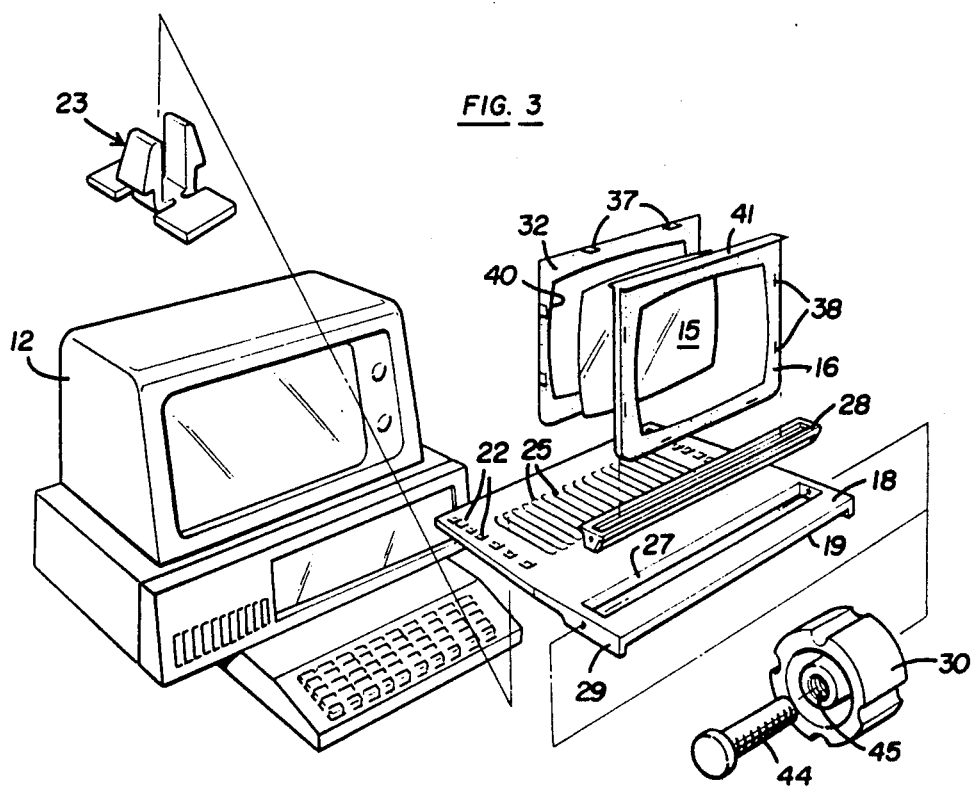
FIG. 3

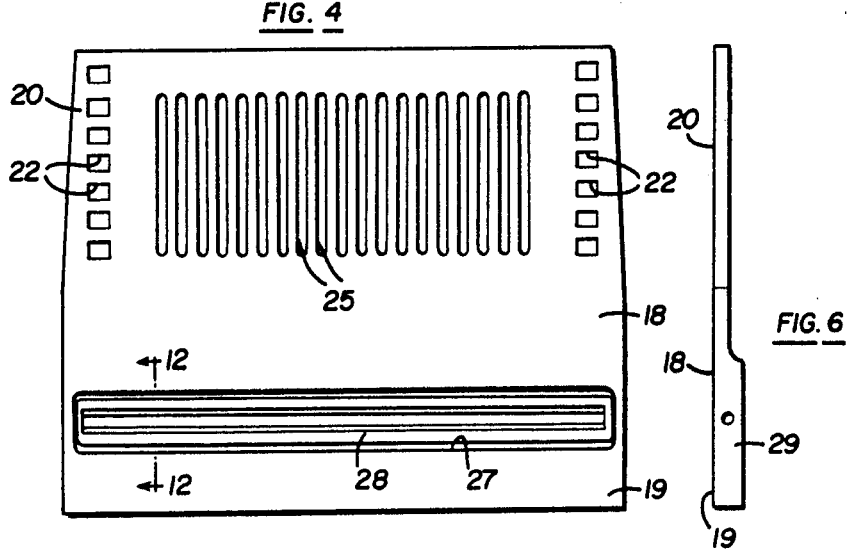
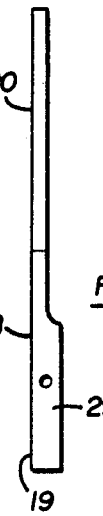
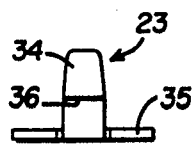
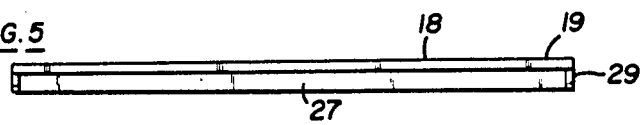
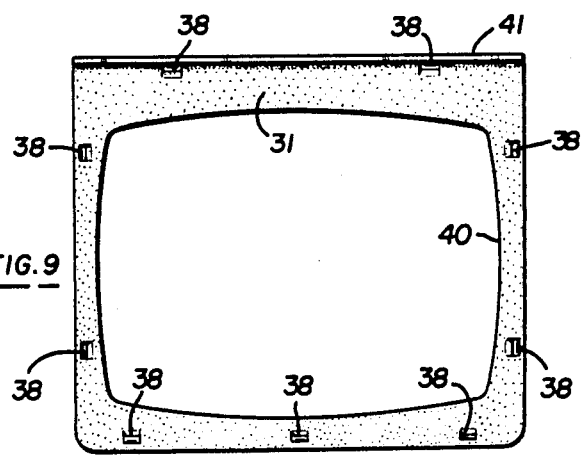
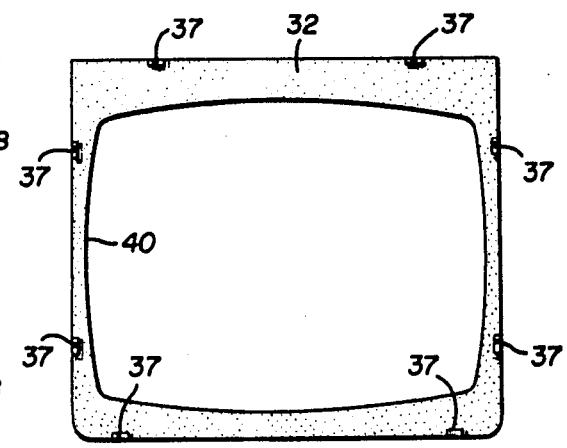
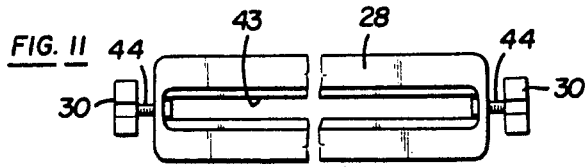
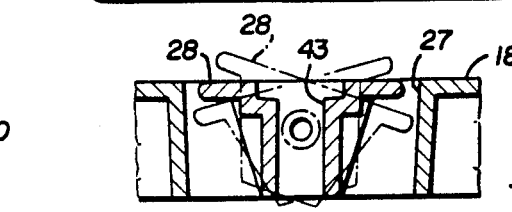
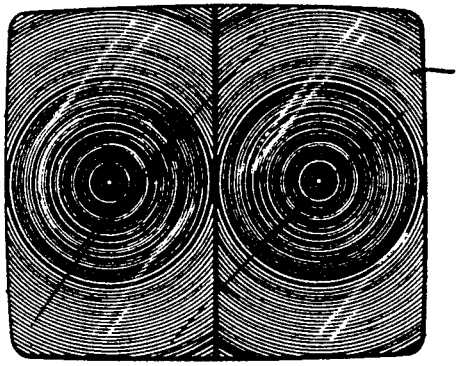
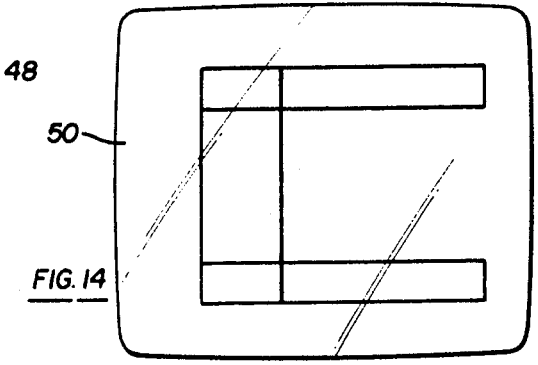

RETROFIT VISUAL DISPLAY LENS HOLDER

TECHNICAL FIELD

The present invention relates to computer visual display lenses, or optical elements, and apparatus for holding the lenses in a position in front of the display screen. In particular, the invention relates to a bracket or frame including means for adjusting the position and angular orientation of a magnifying, filtering, or tinting lens, or set of lenses, relative to the screen.

BACKGROUND OF THE INVENTION

Computers frequently feature a visual display unit having a screen upon which information and/or graphics are shown. The screen is most often of the cathode ray tube type but may be a plasma gas display, an electro luminescent flat screen, a liquid crystal display, or another type of display.

It is well known to attach an optical element to a visual display screen or form an optical element as an integral part of such a screen. Magnifying lenses are sometimes used to increase the size of the image created by the visual display unit. Tinting lenses are frequently used to change the color of the light output of a visual display screen, hereinafter referred to as a screen, for the purpose of reducing eye strain. It is also known to place a fine mesh filter over the front of the screen, or apply a coating to the front of the screen, to reduce glare.

It is not possible to change the optical characteristics or function of a prior art screen to suit particular application problems if the lenses and filters are formed as an integral part of the screen or permanently attached to the display unit. With the rapid expansion of the use of microprocessors new applications for visual display units are being developed daily. In many applications more than one user may be required to use a single visual display unit and many different programs may be used on a computer which is limited to a particular screen and lens conbination. The eyesight and preferences of different users may make one type of lens satisfactory for one user and objectionable to another. For example, one user may be confronted with a problem of sunlight being reflected from the screen and causing glare at one particular time of the day while another user using the same display unit at a different time may require magnification of the screen image to compensate for poor eyesight. Prior art display units with integral lenses and filters do not offer any way of subsequently altering the optical characteristics of the screen in such situations.

In recent years the amount of information to be displayed on a screen is being increased with the necessity of reducing the size of characters. This is true in part because most screens have a field only 80 characters wide while most printers have a possible field of 132 characters wide. As manufacturers of display units strive to make characters smaller, the need for magnification of the display is increasing. The new plasma gas displays have exceptionally fine resolution with characters being formed on a screen having thousands of dots per inch. Such a plasma gas display can make characters that are very small.

While it is known to place a magnifying element in front of a television on a stand placed on the floor in front of the television, such a device is inappropriate for use with a computer visual display unit because it would block access to the display unit and would be difficult to adjust to the needs of different users.

Different computer programs may create any number of displays and display formats on a screen. Recent innovations include the advent of a split screen display wherein the screen may be divided into two or more parts. The purpose of such an arrangement is to fit additional data on a screen which may also result in a reduction in the size of the characters displayed on the display unit. In addition, a single magnifying lens attached to or placed in front of a display unit is not well suited for use with a split screen display.

Magnifying lenses, and particularly low cost lenses, typically have a low distortion area in the central part of the lens with increased distortion about the periphery of the lens. Such distortion is objectionable in single cell displays and is even more objectionable in split screen displays since large portions of the display may have to be viewed through a distorted portion of the lens. A single magnifying lens attached to or places in front of a diaplay unit fails to offer any way of adjusting the lens to position the low distortion, or central, part of the lens over a selected part of the screen.

These problems have been overcome by the present invention which realizes other advantages and offers users a choice in optical elements and adjustability in positioning the optical elements that was not previously available.

SUMMARY OF THE INVENTION

The present invention relates to an adjustable visual display unit lens mounting system that permits different types of lenses, filters and screens to be held in position in front of a visual display screen. The device permits interchange of lenses that may magnify, tint or otherwise modify the image produced by the screen to suit the needs of the user or requirements of a particular program display.

The lens mount of the present invention holds the lens spaced from the front of the screen. The space between the lens and the screen may be adjusted to change the amount of magnification caused by a magnifying lens. The invention also permits the lens to be moved from side to side relative to the screen and to be set at different angles so as to direct the lens toward any desired portion of the screen. The adjustment features permit the use of low cost lenses since the effects of distortion can be minimized by directing the low distortion portion of the lens toward the portion of the screen that is of interest to the user.

Another advantage realized by the present invention is the ability to provide special template lenses which include masks or other indicia that may be used with specified programs to supply column headings, borders or highlighted areas that are not easily created by software. Programming may be simplified and output made more readily visible by using special masks or screen elements. Use of such special software and template lenses may also reduce piracy of such specialized programs since a would-be software pirate would not be able to simply duplicate software because the display created by the software is incomplete. The would-be pirate would also have to duplicate the template lens to use with the pirated program thereby adding to the cost of pirated copies and consequently detering software piracy.

With the present invention it is possible to provide adjacent magnifying elements which are each centered relative to one portion of a split screen display. Centering the magnifying elements over the split screen reduces the effect of any distortion in the peripheral portion of the lens elements. If the display is then changed back to a non-split screen display the multiple cell magnifying lens may be removed or replaced.

By locating a Fresnel magnifying lens at a spaced distance in front of the screen an added advantage is realized in that the viewing angle of the display unit is narrowed. Reducing the viewing angle adds security since persons other than the user may not observe the visual display from a peripheral angle. This feature makes it more difficult for persons other than the user to learn confidential data that is frequently accessible to a computer user.

When a magnifying lens is used with the adjustable lens mount of the present invention, it is possible to clearly read the visual display within the viewing angle from a remote location, such as across a room. When the device is used on terminals having remote keyboard units, it eliminates the need for workers to be face to face with the display screen for extended periods of time because a user is able to read the display from a distance. This feature reduces eye strain of the user and permits increased mobility while using the computer. With added mobility computer users will be able to change their viewing position thereby eliminating any neck or back discomfort caused by sitting in one position for an extended period of time.

These and other advantages and objects will be readily apparent in view of the attached drawings and upon studying the detailed description of the preferred embodiments of the present invention.

BRIEF DESCRIPTION OF THE DRAWINGS

FIG. 1 is a perspective view of a visual display unit with the retrofit visual display lens holder of the present invention installed thereon.

FIG. 2 is a perspective view of the retrofit visual display lens holder of the present invention.

FIG. 3 is an exploded perspective view of the retrofit visual display lens holder of the present invention and a visual display unit.

FIG. 4 is a plan view of the support member of the present invention.

FIG. 5 is a front elevational view of the support member of the present invention.

FIG. 6 is a side elevational view of the support member of the present invention.

FIG. 7 is a front view of one of the clips used to secure the support member to a display unit.

FIG. 8 is a side view of the clip shown in FIG. 7.

FIG. 9 is a front elevational view of the front panel of the lens frame.

FIG. 10 is a front elevational view of the back panel of the lens frame.

FIG. 11 is a fragmentary plan view of the pivotable bracket by which the lens frame is attached to the support member.

FIG. 12 is a cross-sectional view of the pivotable bracket shown in FIG. 11 with dotted lines showing the pivoted positions of the bracket.

FIG. 13 is a dual Fresnel lens made in accordance with one embodiment of the present invention which is especially useful with split screen displays.

FIG. 14 is a template lens made in accordance with another embodiment of the present invention.

DETAILED DESCRIPTION

Referring now to FIG. 1, the lens holder 10 of the present invention is shown attached to a display unit 12 of a microcomputer.

As shown in FIG. 2, the lens holder 10 includes a lens or optical element 15 which is retained within a frame 16. The frame 16 is mounted on a cantilevered support member 18 to be adjustable in several directions. The support 18 may be placed in several positions so that the lens 15 may be moved toward or away from the screen 13. The frame 16 may also be adjusted laterally relative to the screen 13 or tilted to change the angular orientation of the lens 15 relative to the screen 13. The fore-and-aft adjustment is shown as arrow "A", the lateral adjustment is shown as arrow "B" and the tilt adjustment is shown as arrow "C".

Referring now to FIG. 3, the lens holder 10 of the present invention is shown as an exploded perspective view to better show the component parts of the invention. A clip 23 and a knob 30 of the lens holder 10 are enlarged to show the details thereof.

The cantilevered support 18 as shown in FIGS. 3 through 6 includes a hood 19 which is disposed generally over and in front of the screen 13 which both supports the lens 15 and shades the screen 13 and lens 15 from overhead light. Shading the screen is an important feature with low contrast displays such as a liquid crystal display. The support member 18 also includes a mounting portion 20 which is disposed over the display unit 12. A series of holes 22 on opposite lateral sides of the mounting portion 20 and are adapted to receive the clips 23 for retaining the support member 18 on the display unit 12. The support member 18 also has a plurality of vent slots 25 formed in the mounting portion to permit adequate ventilation of the display unit 12. The location of the vent slots 25 correspond to the top vent of a particular display unit 12.

An elongated opening 27 is formed in the hood 19 to receive a pivotable bracket 28 for retaining the frame 16 of the lens 15 and securing it to the support member 18. Side flanges 29 are provided on opposite sides of the hood 19 to reinforce the hood 19 of the support member 18. The bracket 28 is also mounted on the support member 18 by means of the side flanges 29. Adjustment knobs 30 are provided on opposite sides of the pivotable bracket 28, as will be more fully described below.

Referring now to FIGS. 3, 7 and 8, the clips 23 are shown to include spaced tabs 34 which engage opposite sides of the holes 22. The tabs 34 extend from the base portion 35 which is secured by an adhesive foam tape or other means to the top of the display unit 12. The tabs 34 include a shoulder 36 for retaining the support member 18 on the clips 23 until the tabs 34 are squeezed together to allow the shoulders 36 to disengage the opposite sides of the holes 22. It will be readily appreciated that the position of the support member 18 may be changed relative to the display unit 12 by simply disengaging the clips 23 from the holes 22 and reinserting them in a different pair of holes 22. When the support member 18 is moved to a different position the distance between the lens 15 and the screen 13 is changed which results in a modification of the magnification power of a magnifying lens.

The frame 16, as shown in FIGS. 3, 9 and 10, includes a front panel 31 and a back panel 32 which sandwich the lens or optical element 15 therebetween. The front panel 31 and back panel 32 are secured together by means of the perimeter tabs 37 which are formed on the back panel 32 and the slots 38 formed in the front panel 31. The lens 15 is secured between the front and back panels 31 and 32 by locking the tabs 37 into the slots 38. The frame 16 includes a lens cut out 40 through which the lens 15 is exposed. A T-flange 41 is formed on the top of the frame 16 to hold the frame in the pivotable bracket 28.

The pivotal bracket 28 includes an elongated slot 43 for receiving the frame 16 so that T-flange 41 rests upon the top of the slot 43. The pivotable bracket 28 is secured in the support member by means of screws 44 on opposite sides of the bracket 28. The screws 44 are secured to the adjustment knobs 30 and extend through an enlarged hole 45 formed in each of the side flanges 29. The screws 44 then engage threaded holes 46 on opposite sides of the pivotable bracket 28. The pivotable bracket may be selectively locked in position or turned by the adjustment knobs 30 wherein loosening the adjustment knobs 30 permits the pivotable bracket to tilt relative to the support member 18 and the screen 13.

This offers an important advantage in the present invention wherein the lens 15 may be directed toward the upper or lower portion of the screen 13 at the option of the user. When the lens 15 is placed in its desired position, the adjustment knobs 30 may be tightened to lock the lens 15 in place by the frictional force exerted by the adjustment knobs 30 on the outside of the side flanges 29. If a user wished to view the screen without a lens 15 or optical element it is a simple matter to remove the frame 16 from the bracket 28.

The elongated slot 43 is preferably longer than the length of the frame 16 so that the lens may be moved in the direction shown by arrow "B" parallel to the face of the screen 13. In this way the lens 15 may be directed toward one portion of the screen or another depending upon the need to concentrate on one part of the screen 13.

Referring now to FIG. 13, a dual Fresnel lens is shown which according to a preferred embodiment of the present invention may be provided when a split screen display is used. In recent years an emphasis has been placed upon the need to increase the amount of information shown on a visual display screen placed upon the need to increase the amount of information shown on a screen which necessarily results in the reduction in the size of characters displayed. When split screen displays are used the size of characters is further reduced which makes the use of a split magnifying lens advantageous because any peripheral distortion will not affect the centr of either display.

In another embodiment shown in FIG. 14, a template lens 15 is shown which may be inserted between the front and back panels 31 and 32 of the frame 16. The indicia on the template lens 50 may consist of bars, numbers, letters, tinted areas or any other marking that may be used to highlight or compliment a software generated image. The use of a template lens may simplify certain software packages and reduce the amount of memory required to perform a program by eliminating the need to program extensive display generation instructions. Another advantage realized by the template lens 50 embodiment is that software piracy is discouraged since duplication of the software would result in an incomplete program that in some instances could be substantially unusable without also duplicating the template lens 50. The adjustability of the lens mount of the present invention permits the template lens to be precisely positioned to complement the displayed data.

The embodiments of the present invention are presented as an example and not by way of limitation and the scope of the invention should be measured by reference to the following claims.

I claim:

1. An optical element holder for use with a computer display unit having a visual display screen comprising:
   an optical element;
   a frame attached about the periphery of the optical element;
   a support means adapted to be attached to the computer display unit and extending over the front of the computer display unit for holding the frame and optical element spaced from the visual display screen;
   spacing adjustment means provided on said support means for changing the distance between said optical element and said visual display screen;
   tilt adjustment means provided on said support means for changing the angular orientation of the optical element relative to the visual display screen; and
   means provided on said support means for selectively adjusting the optical element laterally and parallel to the visual display screen.

2. The optical element holder of claim 1 wherein the optical element is a Fresnel lens which is selectively adjustable laterally relative to the display unit.

3. The optical element holder of claim 1 wherein the optical element is a glare reducing screen.

4. An optical element holder for use with a computer display unit having a visual display screen comprising:
   an optical element including a plurality of Fresnel lenses adjacent to one another;
   a frame attached about the periphery of the optical element;
   a support means adapted to be attached to the computer display unit and extending over the front of the computer display unit for holding the frame and optical element spaced from the visual display screen;
   spacing adjustment means provided on said support means for changing the distance between said optical element and said visual display screen;
   tilt adjustment means provided on said support means for changing the angular orientation of the optical element relative to the visual display screen; and
   lateral adjustment means provided on said support means for permitting movement of the optical element parallel to the visual display screen.

5. An optical element holder for use with a computer display unit having a visual display screen comprising:
   an optical element;
   a frame attached about the periphery of the optical element;
   a support means adapted to be attached to a top surface of the computer display unit on one end by first and second upstanding clips, said clips each being adapted to be received within a hole formed in the support means and being selectively secured to the clips, and extending over the front of the computer display unit for holding the frame and optical element spaced from the visual display screen;

spacing adjustment means provided on said support means for changing the distance between said optical element and said visual display screen;

tilt adjustment means provided on said support means for changing the angular orientation of the optical element relative to the visual display screen; and lateral adjustment means provided on said support means for permitting movement of the optical element parallel to the visual display screen.

6. The optical element holder of claim 5 wherein said spacing adjustment means comprises a plurality of holes provided for each of the clips to permit the support means to be repositioned on the computer display unit to move the optical element in the direction perpendicular to the screen.

7. An optical element holder for use with a computer display unit having a visual display screen comprising:

an optical element;

a frame attached about the periphery of the optical element;

a support means adapted to be attached to the computer display unit and extending over the front of the computer display unit for holding the frame and optical element spaced from the visual display screen;

spacing adjustment means provided on said support means for changing the distance between said optical element and said visual display screen;

tilt adjustment means provided on said support means for changing the angular orientation of the optical element relative to the visual display screen, said tilt adjustment means having an elongate bracket having a slot formed therein for receiving an end of the frame;

said elongate bracket being pivotably supported on the support means and having means for preventing pivotable movement thereof; and lateral adjustment means provided on said support means for permitting movement of the optical element parallel to the visual display screen.

8. The optical element holder of claim 7 wherein said lateral adjustment means is provided by making the slot in the bracket longer than the frame thereby permitting said frame to slide along the length of the slot.

9. An optical element holder adapted to be secured to a display unit having a screen comprising:

a substantially planar optical element including a plurality of Fresnel lenses adjacent to one another;

a frame disposed about the periphery of the optical element;

support means attached to the display unit and extending above and in front of the screen; and a bracket mounted on the support means having a means for retaining the frame and the optical element in front of and spaced from the screen and having means for selectively preventing movement of the bracket.

10. An optical element holder adapted to be secured to a display unit having a screen comprising:

a substantially planar optical element;

a frame disposed about the periphery of the optical element;

support means attached to a top surface of the computer display unit on one end by first and second upstanding clips, said clips each being adapted to be received within a hole formed in the support means and being selectively secured to the clips, and extending above and in front of the screen; and a bracket mounted on the support means having a means for retaining the frame and the optical element in front of and spaced from the screen and having means for selectively preventing movement of the bracket.

11. The optical element holder of claim 10 wherein said support means has a plurality of holes formed therein for receiving each of the first and second upstanding clips to permit moving the support means and the optical element relative to the screen.

12. An optical element holder adapted to be secured to a display unit having a screen comprising:

a substantially planar optical element;

a frame disposed about the periphery of the optical element;

support means attached to the display unit and extending above and in front of the screen;

a bracket mounted on the support means having a means for retaining the frame and the optical element in front of and spaced from the screen and having means for selectively preventing movement of the bracket; and lateral adjustment means for moving the optical element parallel to the screen.

13. The optical element holder of claim 12 wherein the optical element is a glare reducing screen.

14. The optical element holder of claim 12 wherein said lateral adjustment means is provided by forming a slot in the bracket of greater length than the length of the frame thereby permitting the frame to move laterally within the slot.

15. The optical element holder of claim 12 wherein the optical element is a template lens having indicia marked thereon whereby portions of the display may be highlighted or complemented.

* * * * *